Oct. 9, 1956    F. W. BOTSCH    2,765,653
WORK MEASURING APPARATUS
Filed April 15, 1955    2 Sheets-Sheet 1
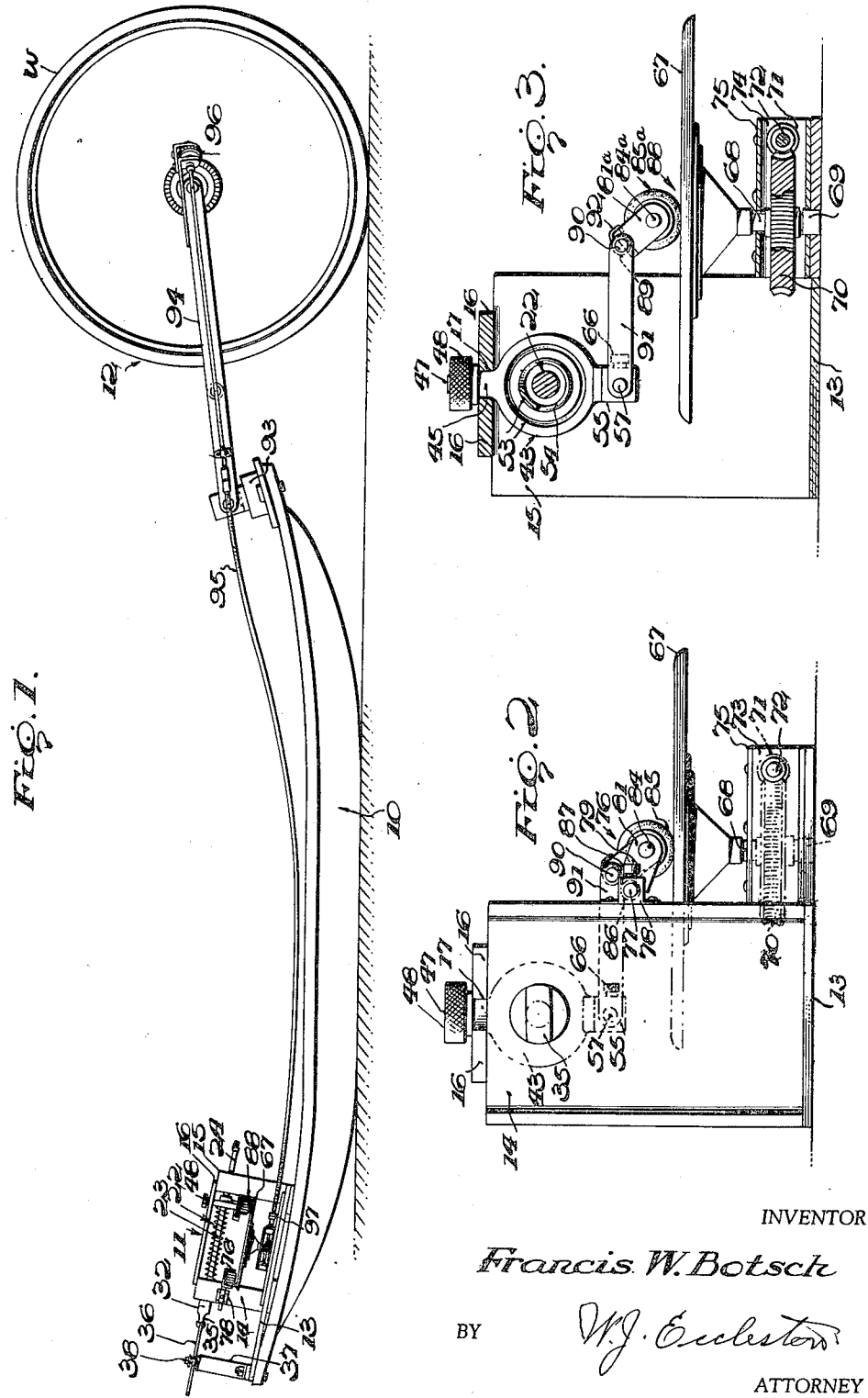
INVENTOR
*Francis W. Botsch*
BY *W. J. Eccleston*
ATTORNEY INVENTOR.
Francis W. Botsch.
BY
W. J. Eccleston
ATTORNEY

United States Patent Office 2,765,653
Patented Oct. 9, 1956

2,765,653

WORK MEASURING APPARATUS

Francis W. Botsch, Framingham, Mass., assignor to the United States of America as represented by the Secretary of the Army Application April 15, 1955, Serial No. 501,753

3 Claims. (Cl. 73—141)

(Granted under Title 35, U. S. Code (1952), sec. 266)

The invention described herein, if patented, may be manufactured and used by or for the Government for governmental purposes, without the payment to me of any royalty thereon.

My invention relates to work measuring apparatus, and more particularly to apparatus for measuring the work done in pulling a trailing load.

An important object of the invention is to provide apparatus of the above-mentioned character including integrating means for calculating the work done in pulling a given load.

A further object is to provide an integrator for a work measuring apparatus of the above-mentioned type which may be used for directly calculating work and which dispenses with the necessity in the apparatus for plotting a curve or graph, the area beneath which would normally indicate the amount of work done in pulling a given trailing load.

Another object is to provide apparatus of the above-mentioned character which is easy to assemble, disassemble and adjust, reliable and efficient in operation, and relatively inexpensive to build.

Other objects and advantages of the invention will be apparent during the course of the following description.

Figure 4:
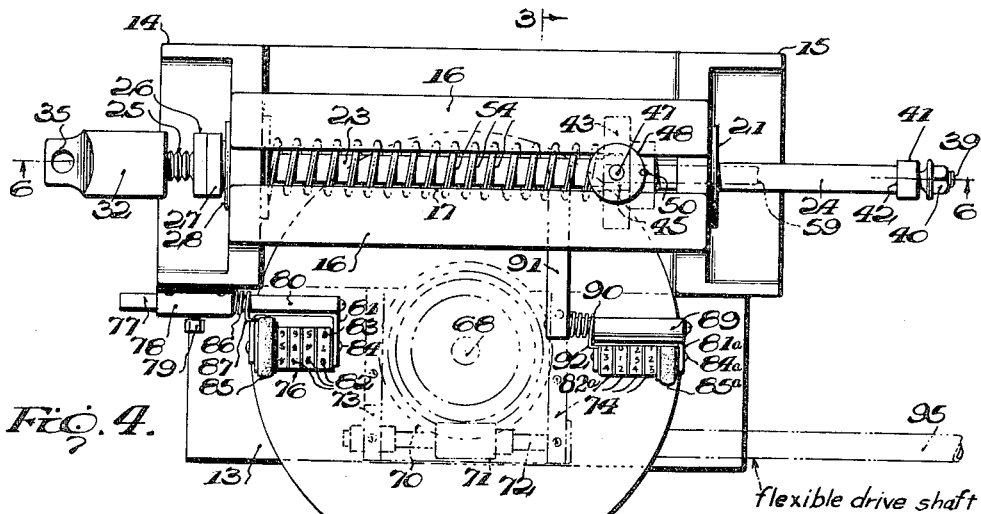
Figure 5:
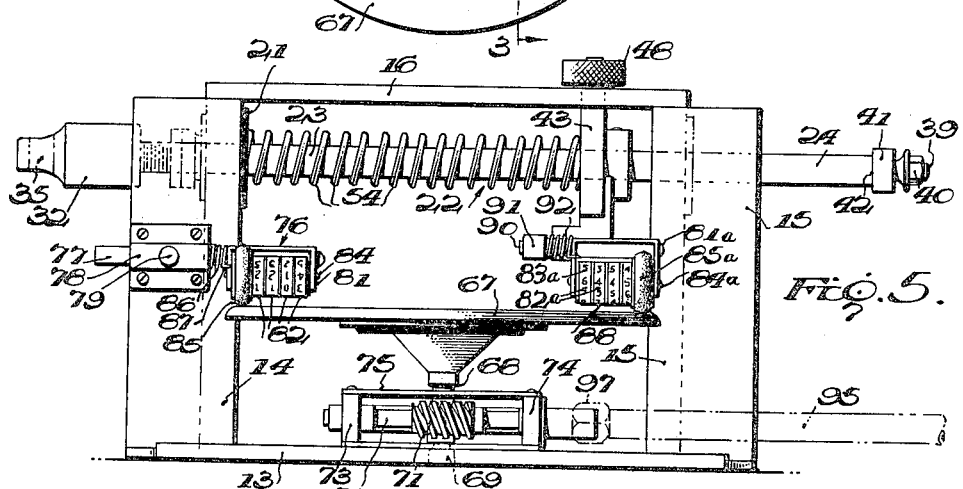
Figure 6:
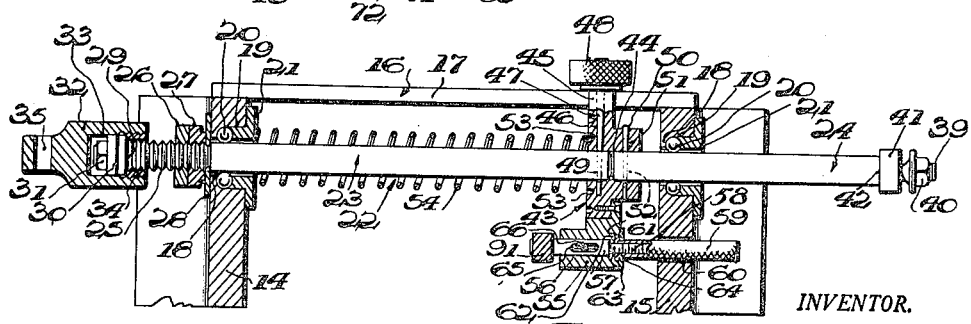

In the accompanying drawings, forming a part of this specification, and in which like numerals are employed to designate like parts throughout the same, Figure 1 is a side elevation of apparatus embodying the invention, Figure 2 is an end elevation of the apparatus, on a large scale, Figure 3 is a transverse vertical section taken on line 3—3 of Figure 4, Figure 4 is a plan view of part of the apparatus, Figure 5 is a side elevation of the same, and, Figure 6 is a longitudinal vertical section taken on line 6—6 of Figure 4.

In the drawings, where for the purpose of illustration is shown a preferred embodiment of my invention, the numeral 10 designates a boat-type sled, which is one illustrative example of a trailing load with which the work measuring apparatus may be used.

The apparatus proper comprises forward and rear units 11 and 12 respectively which are independently connected with the load 10, and operatively connected together in a manner to be described. The forward unit 11 is concerned with the measurement for calculation of the work done in pulling the load 10, and includes the integrating means referred to above. The rear unit 12 is concerned with measuring the distance travelled by the trailing load or sled 10 in response to the pulling force applied at the forward unit 11.

The forward unit 11 preferably comprises a base plate 13, suitably rigidly secured to the top of the sled 10 near the forward end of the same, as shown in Figure 1. A pair of rigid upstanding support members or legs 14 and 15 are rigidly secured to the base plate 13 and extend thereabove. A pair of laterally spaced parallel longitudinal guide bars 16 are rigidly secured by welding or the like to the tops of the members 14 and 15 and extend therebetween for forming a longitudinal guide passage or slot 17.

The members 14 and 15 are provided near their upper ends with aligned openings 18 (Fig. 6) and recesses 19 in corresponding sides of the same for receiving ball bearings 20 or the like. The ball bearings 20 are retained in the recesses 19 by retainer caps 21, rigidly secured to the members 14 and 15.

A longitudinally shiftable pull rod or shaft 22 has substantially frictionless engagement with the ball bearings 20 and is bodily supported thereby and free from other connection with the members 14 and 15. The pull shaft 22 extends for the full distance between the members 14 and 15, and also forwardly and rearwardly thereof, as shown. The pull shaft 22 comprises two separate shaft sections 23 and 24, detachably but rigidly secured together by means to be described.

Forwardly of the member 14, the shaft section 23 has a screw-threaded portion 25, carrying a pair of adjusting nuts 26 and 27. The rearmost nut 27 preferably abuts a hard steel washer 28 or the like, surrounding the shaft section 23 between the adjusting nuts and the member 14, and this washer bears against the forward side of the member 14. Forwardly of the screw-threaded portion 25, the shaft section 23 has a reduced screw-threaded extension forming a shoulder 29 on the shaft section 23. A thrust type ball bearing 30 is mounted upon the reduced extension of the shaft section 23 and clamped against the shoulder 29 by a nut 31 having screw-threaded engagement with the reduced extension. A swivel coupling 32 has a recess 33 in its rear end, receiving the thrust bearing 30, and the rear portion of the recess 33 is screw-threaded for receiving a screw-threaded plug 34, which bears against the rear side of the bearing 30 and serves to secure the coupling 32 to the pull shaft 22. The plug 34 has a smooth bore free from engagement with the screw-threaded portion 25, whereby the coupling 32 is freely swiveled upon the pull shaft 22. The coupling 22 is provided at its forward end with an eye 35, by means of which a flexible element or rope 36 (Fig. 1) is secured to the pull shaft 22.

Forwardly of the upstanding member 14, an upstanding rigid bracket 37 is suitably rigidly secured to the forward end of the base plate 13. A pair of laterally spaced grooved sheaves 38 are freely journaled upon the top of the bracket 37, and the rope 36 passes between the sheaves 38 and has substantially frictionless engagement therewith. This arrangement maintains the rope 36 straight and in alignment with the axis of the pull shaft 22 between the coupling 32 and the bracket 37, whereby a true axial pull will be imparted to the pull shaft 22 when the rope 36 is tensioned forwardly of the sheaves 38 during the operation of the apparatus. Forwardly of the bracket 37, the rope 36 is suitably connected to a suitable harness device, not shown, to be worn by the test subject or man pulling the sled or load 10.

The rear pull shaft section 24 in the unloaded condition, Figure 6, extends rearwardly of the member 15 for a substantial distance, and is provided with a reduced screw-threaded extension 39 carrying a nut 40. This nut 40 engages a removable stop collar 41 upon the shaft section 24, engaging a shoulder 42 of the shaft section. When the pull shaft 22 moves forwardly during the operation of the apparatus, the stop collar 41 will engage the cap 21 for limiting the forward movement of the pull shaft.

A spring abutment head or plate 43 has an opening or bore 44 (Fig. 6) receiving the adjacent end portions of the shaft sections 23 and 24, Figure 6, and the head 43 is provided at its top with an integral lug 45 engaging slidably within the guide slot 17 and having a smooth running fit therein. A diametrically tapered opening 46 in the head 43 receives a long tapered pin 47 having an enlarged knurled head 48 at its upper end, above the lug 45. The tapered pin 47 is received by a tapered opening 49 in the shaft section 23, near the rear end of the same, and thus the pin 47 serves to detachably rigidly secure the head 43 to the shaft section 23.

The rear shaft section 24 is similarly detachably rigidly secured within the bore 44 of the head 43 by a tapered pin 50, received within registering tapered openings 51 and 52 in the head 43 and shaft section 24 respectively.

The head 43 is provided in its forward vertical face with a plurality of concentrically spaced annular grooves 53 (Fig. 3) of different diameters for seating corresponding ends of calibrated force measuring springs 54 provided for use with the apparatus. The particular spring 54 shown in the drawings is merely illustrative of the use of the apparatus in connection with a particular load 10, and when a different load is used in connection with the apparatus, a spring 54 of different diameter will be employed. The spring 54 surrounds the pull shaft 22 between the head 43 and the cap 21 of member 14, and the rear end of the spring is centered by one of the grooves 53, while its forward end bears against the cap 21, Figure 6. The spring 54 normally urges the pull shaft 22 rearwardly and maintains the nut 27 in contact with the steel washer 28.

The head 43 is provided at its bottom with a block or extension 55, rigidly secured thereto and having a longitudinal bore 56 extending therethrough, slidably receiving a longitudinally movable adjusting shaft 57. The adjusting shaft 57 has a screw-threaded extension 58 extending beyond the rear side of the block 55, and this extension 58 has mounted thereon a long knurled adjusting nut or sleeve 59, which projects through a clearance opening 60 in the upright 15. The nut 59 has a forward enlarged head 61 received by an enlarged counterbore 62 in the block 55, and a collar or plate 63, rigidly secured to the rear end of the block 55 engages within an undercut groove or recess 64 of the adjusting nut 59, to complete the swiveled connection of the nut with the block 55. The shaft 57 is thus bodily shiftable forwardly and rearwardly of the block 55 by means of the swiveled adjusting nut 59 and associated elements.

The adjusting shaft 57 has a slot 65 in its side, receiving a setscrew 66 having screw-threaded engagement with the block 55. By this means, the shaft 57 is held against rotation within the bore 56 during its longitudinal movement. The setscrew 66 may be tightened at any time for positively locking the adjusting shaft 57 in the selected longitudinally adjusted position relative to the block 55 and head 43.

The parts so far described are substantially identical with the corresponding parts of the Bommarito and Harvey Patent No. 2,712,234 dated July 5, 1955 entitled Work Measuring Apparatus, except that in the patented apparatus, a stylus assembly 61 is mounted on the forward end of an adjusting shaft 60, adjustment of the stylus being made to properly place the stylus on the traveling web 68 of recording paper; while in the present construction, no stylus or web of recording paper or web-driving elements are used. Instead, automatically integrating, work-measuring means are provided including a circular horizontal turntable or disk 67 spaced below the block 55 and associated elements and between the uprights 14 and 15 and offset laterally with respect to the same, Figure 4. The turntable 67 is mounted for rotation with a vertical shaft or axle 68, rigidly secured thereto, and having its lower end received within a vertical thrust bearing 69, rigidly secured by any suitable means to the base plate 13. The vertical shaft 68 has a worm wheel 70 rigidly secured thereto for rotation therewith above the bearing 69 and base plate 13. A worm 71 mounted upon a horizontal shaft 72 meshes with the worm wheel 70 for driving the same, and the worm shaft 72 has its ends journaled within suitable bearings 73 and 74, rigidly secured to the base plate 13 upon opposite sides of the worm wheel 70, Figure 4. A horizontal rectangular cover plate 75 is suitably rigidly secured to the tops of the bearings 73, 74 and serves to house or cover the gears 70 and 71. The vertical shaft 68 operates through an opening in this cover plate 75.

A relatively stationary counter 76 is provided above the turntable 67 and adjacent the periphery of the same and near the fixed upright 14. This counter 76 embodies a shaft or spindle 77, held within a horizontal sleeve 78, rigidly secured to a side of the member 14 by any suitable means. A setscrew 79 having screw-threaded engagement within a screw-threaded opening of the sleeve 78 engages the spindle 77 to lock the same in the selected adjusted position. A sleeve 80 (Fig. 4) is freely journaled upon the inner end portion of the spindle 77, inwardly of the sleeve 78, and a U-shaped bracket 81 is rigidly secured by welding or the like to the sleeve 80. The counter 76 embodies a plurality of rotatable disks 82 having numerals 83 provided thereon in circumferentially spaced relation. Numerals or characters from 0 to 9 are provided on each of the disks 82 in the usual manner, and all of the disks 82 are mounted upon rotatable axle means 84 carried by the U-shaped bracket 81. The axle means 84 also carries a rotatable crowned wheel 85 of hard rubber or the like which rolls upon the top surface of turntable 67 adjacent the periphery of the same, and rotation of the wheel 85 by the turntable causes the disks 82 of the counter to rotate in sequence for registering the distance traveled by the periphery of the turntable in a manner similar to the operation of an odometer in an automobile or the like. The construction of the counter 76 in this respect is conventional and well known, and the counter need not be described further in detail. A torsional coil spring 86 surounds the sleeve 80 between the bracket 81 and the sleeve 78, and one end of this spring is anchored to the fixed sleeve 78 and its other end is anchored to the adjacent side of the bracket 81, as at 87. The purpose of the spring 86 is to yieldingly hold the rubber wheel 85 in rolling contact with the turntable 67. The counter 76 is bodily adjustable radially of the turntable by means of the setscrew 79 and associated elements to position the wheel 85 accurately at the periphery of the turntable. The wheel 85 remains in this position during the operation of the apparatus. The axis of the wheel 85 is located in the diametral plane of the turntable 67 which is parallel to the axis of the pull shaft 22, see Figure 4.

A relatively movable counter 88 is provided, and the counter 88 may be substantially identical with the counter 76 and may embody the disks 82a similar to disks 82 and bearing the numerals 83a. The counter 88 also includes a crowned hard rubber wheel 85a, axle means 84a and U-shaped bracket 81a. The bracket 81a of counter 88 is rigidly secured to a horizontal sleeve 89 (Fig. 4), pivotally mounted upon a horizontal spindle or shaft 90 corresponding to the spindle 77. The inner end portion of the shaft 90 is rigidly secured within an opening of a rigid horizontal arm or bar 91 which extends inwardly toward and is rigidly secured to the inner end of the adjusting shaft 57, Figure 6. The counter 88 is thus bodily carried by the arm 91 and bodily movable therewith radially of the turntable 67 when the adjusting shaft 57 is moved lengthwise of the bore 56 by means of the knurled adjusting nut 59. The axis of the counter 88 is disposed in the diametral plane of the turntable 67 which is parallel with the axis of the pull shaft 22. The axes of the counters 76 and 88 are therefore in alignment diametrically of the turntable. A torsional coil spring 92 surrounds the shaft 90 between the bracket 81 and the arm 91, and one end of this spring is anchored to the arm 91 while its other end is anchored to the bracket 81 of the counter 88. By this arrangement, the spring 92 serves to yieldingly hold the counter wheel 85a in contact with the top of the turntable 67. The counter 88 is bodily shiftable radially of the turntable 67 with the head 43 and associated elements when the load is placed upon the rope 36. When the apparatus is unloaded, the counter wheel 85a of counter 88 will engage the turntable adjacent its periphery, like the counter wheel of the counter 76. The counter 88 may be given a fine knurled adjustment radially of the turntable by means of the adjusting nut 59. A less fine adjustment of the counter 88 and of the head 43 may be effected by means of the adjusting nuts 26 and 27, as should be obvious.

The rear unit 12 of the apparatus may be identical with the rear unit 12 of the Bommarito and Harvey Patent No. 2,712,234. The rear unit 12 comprises a suitable mounting block 93 rigidly secured to the rear end of the sled 10 as shown in Figure 1. A vertically and horizontally swingable yoke 94 is connected with the block 93 and a bicycle type wheel W is journaled for rotation upon the rear end of the yoke 93, 94, all in the manner shown and described in the aforementioned patent. A flexible drive shaft 95 has its rear end operatively connected with the rotating hub portion of the wheel W by means of gearing 96 in the identical manner shown and described in the Bommarito and Harvey patent, whereby rotation of the wheel W over the ground will impart rotation to the flexible drive shaft 95. The drive shaft 95 is identical in construction to the drive shaft 103 of the aforementioned patent.

The forward coupling member 97 of the flexible drive shaft 95 is operatively connected with the worm shaft 72 for imparting rotation to the same, as best shown in Figure 5. The arrangement is such that rotation of the trailing wheel W through the gearing 96 and through the worm gear 71 and worm wheel 70 imparts slow rotation to the turntable 67 for driving the counters 76 and 88.

The operation of the apparatus is as follows:

With the units 11 and 12 attached to the sled 10 in the manner shown and described, the test subject or individual is connected with the rope 36, forwardly of the pulleys 38 by a suitable body harness, not shown. A known load may be placed upon the sled 10 and the subject proceeds to pull the sled forwardly over snow, or any other type of surface upon which it is desired to conduct the test.

The spring 54 of proper size and strength is chosen prior to the test, depending upon the magnitude of the load or range of forces which it is anticipating transmitting to the apparatus through the rope 36. In order to change or replace the spring 54 it is merely necessary to remove the tapered pin 47 sufficiently to disengage it from the forward pull shaft section 23. The shaft section 23 is then partially withdrawn through the forward bearing 20 and the spring is then readily removable therefrom and may be replaced by a spring of the proper strength calibrated for the given load.

With the proper spring 54 or springs mounted upon the pull shaft 22, the nuts 26 and 27 are adjusted for moving the pull shaft 22 slightly to compensate for minor differences in calibrated spring length, and this adjustment brings the head 43 to the point of 0 pressure against the spring or springs 54. Finally, precise adjustment of the counter 88 is made by means of the nut 59 to bring the counter wheel 85 of the movable counter almost to the periphery of the turntable 67.

The test subject now begins to pull the sled 10 and the apparatus forwardly. As the sled is pulled, the pull shaft 22, head 43 and associated elements will move forwardly relative to the fixed uprights 14 and 15, and the calibrated spring 54 will be compressed according to the amount of resistance offered by the load. Correspondingly, the wheel 85 of counter 88 will be shifted radially inwardly toward the center of the turntable 67, whereas the wheel 85 of the counter 76 will remain at the periphery of the turntable. The turntable 67 will rotate due to the rotation of the wheel 94 over the ground as the sled is pulled forwardly. It may be seen that the movable counter 88 may operate upon the turntable 67 from the periphery of the turntable to some point at or near the center of the same, so that the wheel 85 of the counter 88 will cause the counter to register distance from a maximum at the periphery of the turntable to 0 or substantially 0 at its center. On the other hand, the fixed counter 76 will always measure maximum or total distance moved by the turntable 67 at its periphery.

The counters 76 and 88 thus measure distance around the circumference of a circle on the turntable 67 which is a function of the counter wheel displacement from the center of the turntable. When the spring 54 is under full compression, the wheel 85 of the movable counter 88 is at the center of the turntable and does not rotate. The average part of full deflection of the spring 54 over any distance travelled by the load 10 is equal to the difference between the two elapsed counts of the counters 76 and 88 divided by the elapsed count of the relatively stationary counter 76. This figure can be readily translated into force by means of a spring calibration curve, not shown. The stationary counter 76 is calibrated in distance. The integrated work is a function of the difference between the two elapsed counts of the counters 76 and 88.

It is thus seen that the apparatus dispenses entirely with the necessity for any automatic curve or graph drawing operation in order to calculate the actual work done in pulling a given load. In this respect, my apparatus is essentially different from the work measuring apparatus disclosed in the Bommarito and Harvey patent referred to above. My apparatus is much more simplified and compact, and fewer working parts need be used. Also, the necessity for calculating the work done by measuring the area under the plotted curve or graph by means of a planimeter is dispensed with, as is necessary in Bommarito and Harvey apparatus.

It is to be understood that the form of the invention herewith shown and described is to be taken as a preferred example of the same, and that various changes in the shape, size and arrangement of parts may be resorted to, without departing from the spirit of the invention or the scope of the subjoined claims.

I claim:

1. Automatically integrating work-measuring apparatus comprising, in combination, a sled adapted to be dragged over the surface of the ground; sled-pulling means adapted to be hitched to an animal, person or other source of pulling power capable of travel over the surface of the ground; supporting means fixed to and extending above the sled; a pull shaft mounted on said supporting means so as to move longitudinally in either direction; a coil spring mounted on said shaft; a spring abutment head fixed to said shaft; the coil spring abutting the spring abutment head at one end and part of said supporting means at the other end; means to connect said sled-pulling means with the forward end of said shaft, so that the sled-pulling means will compress said coil spring through said spring abutment head; a ground wheel pivotally connected to the trailing end of the sled; a mechanism including gearing operated by the ground wheel as it rotates in contact with the ground; a turntable mounted on said supporting means so as to be rotatable in a plane below the line of pull of said pulling means and generally parallel to the ground; said mechanism being connected to the turntable so as to drive it at reduced speed as the ground wheel travels; a counter supported by said supporting means and including a wheel whose periphery is in driving contact with the upper surface of said turntable near the periphery of the turntable, and also including a registering mechanism driven by said wheel and totaling the travel of said wheel; and a second counter likewise including a wheel in driving contact with said turntable and a registering mechanism driven by the second-mentioned wheel; said second counter being mounted on and below said spring abutment head and movable therewith with the axis of the second-mentioned wheel maintained in a vertical plane parallel to said reciprocatory shaft and diametric of said turntable.

2. The invention defined in claim 1, wherein the spring abutment head has an extension extending downwardly toward the turntable; a horizontal adjusting shaft slidably mounted on said extension and having a fine threaded end portion; an adjusting nut on the fine threaded end portion which bears against said downward extension to move the horizontal adjusting shaft axially; a horizontal arm being rigidly secured to the opposite end of the horizontal adjusting shaft; said second counter being pivotally mounted on the outer end of said horizontal arm; and a spring being operatively associated with said pivotal mounting to hold the wheel of the second counter in driving contact with said turntable; the adjusting nut effecting an accurate adjustment of the position of the wheel of the second counter on the turntable.

3. The invention defined in claim 1, wherein the spring abutment head has an extension extending downwardly toward the turntable; a horizontal arm immovably secured upon said extension and extending at right angles to the vertical plane of said pull shaft; the second counter being pivotally mounted on the outer end of said horizontal arm; the turntable having a worm wheel fixed thereto and coaxial therewith; and a worm meshing with the worm wheel to drive the turntable; a flexible shaft driving said worm and being operatively connected with said ground wheel-driven mechanism.

References Cited in the file of this patent

UNITED STATES PATENTS

| | | |
|---|---|---|
| 466,214 | Behr | Dec. 29, 1891 |
| 2,712,234 | Bommarito | July 5, 1955 |